United States Patent
Shibata et al.

(10) Patent No.: US 7,427,651 B2
(45) Date of Patent: Sep. 23, 2008

(54) PROCESS FOR PRODUCING CONJUGATED DIENE COPOLYMER RUBBER

(75) Inventors: Masahiro Shibata, Yokkaichi (JP); Naokazu Kobayashi, Yokkaichi (JP); Toshihiro Tadaki, Yokkaichi (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 11/573,308

(22) PCT Filed: Jul. 21, 2005

(86) PCT No.: PCT/JP2005/013414

§ 371 (c)(1), (2), (4) Date: Apr. 19, 2007

(87) PCT Pub. No.: WO2006/013732

PCT Pub. Date: Feb. 9, 2006

(65) Prior Publication Data

US 2007/0265397 A1    Nov. 15, 2007

(30) Foreign Application Priority Data

Aug. 6, 2004 (JP) .............................. 2004-230413
Dec. 16, 2004 (JP) .............................. 2004-363990

(51) Int. Cl.
- C08C 19/00 (2006.01)
- C08C 19/25 (2006.01)
- C08C 19/26 (2006.01)
- C08F 236/10 (2006.01)

(52) U.S. Cl. .................... 525/332.9; 525/102; 525/105; 525/332.3; 525/370; 526/87

(58) Field of Classification Search ................... 526/87, 526/340; 525/105, 102, 332.3, 332.9, 370
See application file for complete search history.

(56) References Cited

U.S. PATENT DOCUMENTS 4,297,240 A * 10/1981 Bingham et al. ............. 502/153
4,743,652 A * 5/1988 Yoshida et al. ............... 525/105

FOREIGN PATENT DOCUMENTS

| JP | 33 2793 | 4/1958 |
|----|---------|--------|
| JP | 33 2794 | 4/1958 |
| JP | 45 25310 | 8/1970 |
| JP | 53 1278 | 1/1978 |
| JP | 63 118343 | 5/1988 |
| JP | 2003 171418 | 6/2003 |
| JP | 2004 51869 | 2/2004 |

* cited by examiner

*Primary Examiner*—Fred M Teskin
(74) *Attorney, Agent, or Firm*—Oblon, Spivak, McClelland, Maier & Neustadt, P.C.

(57) ABSTRACT

A process for producing a conjugated diene copolymer rubber which comprises initiating a copolymerization reaction in a reaction system containing a first conjugated diene compound and a first aromatic vinyl compound and completing the reaction, adding a first polyfunctional monomer to the reaction system, optionally further adding a second conjugated diene compound and a second aromatic vinyl compound, and further conducting copolymerization reaction, and adding a modifier to the reaction system to react the modifier with the copolymer. A rubber composition having excellent processability, exhibiting sufficient hardness even after vulcanization, and possessing reduced rolling resistance can be obtained.

21 Claims, No Drawings

PROCESS FOR PRODUCING CONJUGATED DIENE COPOLYMER RUBBER

TECHNICAL FIELD

The present invention relates to a process for producing a conjugated diene copolymer rubber and a conjugated diene copolymer rubber produced by the process. More particularly, the invention relates to a process for producing a conjugated diene copolymer rubber from which a rubber composition excellent in processability and possessing reduced rolling resistance can be obtained and a conjugated diene copolymer rubber produced by the process.

BACKGROUND ART

Development of a conjugated diene rubber suitable for use in a rubber material (rubber composition) for tires exhibiting reduced rolling resistance, high abrasion resistance, excellent breaking strength, as well as superior operational stability performance represented by wet skid resistance is desired to cope with a recent demand for vehicles with a low fuel consumption.

A method of using a rubber composition containing silica or a mixture of silica and carbon black as a reinforcing agent as a rubber material for tires has been proposed. Tire treads containing silica or a mixture of silica and carbon black have small rolling resistance and exhibit excellent operational stability performance represented by wet skid resistance. However, a rubber composition in which silica is blended is generally interior in processability to rubber compositions in which carbon black is blended.

As a related art, there is disclosed a method for producing a conjugated diene copolymer rubber, where a conjugated diene copolymer rubber is obtained by copolymerizing a conjugated diene compound and an aromatic vinyl compound, adding the conjugated diene compound to the reaction system further to react with the copolymer, and then causing an appropriate coupling agent to react with active copolymer terminals (for example, refer to Patent Documents 1 and 2). A conjugated diene copolymer rubber suitable for obtaining a rubber composition with a small rolling resistance can easily be produced by this method.

However, the conjugated diene copolymer rubber obtained by the method disclosed in Patent Document 1 does not necessarily have excellent processability. Therefore, it has been necessary to improve processability of the resulting rubber. In addition, in the case that the resultant rubber is vulcanized since the rubber after the vulcanization (vulcanized rubber) tends to decrease in hardness, development of a production method for improving the hardness has been desired. Further, in order to reduce the production cost while avoiding complication of production steps, development of a process that can complete polymerization for a time equal to that for the conventional process, without prolonging the time required for polymerization has been desired.
[Patent Document 1] JP-A-2003-171418
[Patent Document 2] JP-A-2004-51869

DISCLOSURE OF THE INVENTION

The present invention has been achieved in view of these problems in the related art technology and the objective thereof is to provide a process for producing a conjugated diene copolymer rubber that can produce a rubber composition having excellent processability, exhibiting sufficient hardness even after vulcanization, and possessing reduced rolling resistance.

The objective of the present invention is to provide a process for producing a conjugated diene copolymer rubber that can produce a rubber composition having excellent processability, exhibiting sufficient hardness even after vulcanization, and possessing reduced rolling resistance, within such a short polymerization time equal to that for conventional processes, too.

The objective of the present invention is to provide a conjugated diene copolymer rubber that can produce a rubber composition having excellent processability and possessing reduced rolling resistance.

The inventors of the present invention have conducted extensive studies in order to achieve the above objectives. As a result, the inventors have found that the above objectives can be achieved by copolymerizing firstly a conjugated diene compound and an aromatic vinyl compound or the like to obtain a copolymer, adding a predetermined polyfunctional monomer to the reaction system to further conduct the copolymerization reaction, and adding a modifier to the reaction system to react the modifier with the resulting copolymer. This finding has led to the completion of the present invention.

The inventors of the present invention have further found that the above objectives can be achieved by copolymerizing a conjugated diene compound and an aromatic vinyl compound or the like and in the course of the reaction when the polymerization conversion rate is within a predetermined range, adding a predetermined polyfunctional monomer to the reaction system to complete the copolymerization reaction, and adding a modifier to the reaction system to react the modifier with the resulting copolymer. This finding has led to the completion of the present invention.

That is, according to the present invention, there are provided the following process for producing a conjugated diene copolymer rubber and conjugated diene copolymer rubber produced by the process thereof.

[1] A process for producing a conjugated diene copolymer rubber which comprises initiating a copolymerization reaction in a reaction system containing a first conjugated diene compound and a first aromatic vinyl compound and completing the reaction; adding a first polyfunctional monomer to the reaction system optionally further adding a second conjugated diene compound and optionally further adding a second aromatic vinyl compound to further conduct copolymerization reaction; and adding a modifier to the reaction system to react the modifier with the copolymer (hereinafter sometimes referred to as "first process for producing conjugated diene copolymer rubber").

[2] A process for producing a conjugated diene copolymer rubber which comprises initiating a copolymerization reaction in a reaction system containing a first conjugated diene compound and a first aromatic vinyl compound, optionally further adding a second conjugated diene compound and optionally further adding a second aromatic vinyl compound to complete the copolymerization reaction and adding a modifier, wherein a first polyfunctional monomer is added to the reaction system in the course of the reaction at a time when the polymerization conversion rate is 30% or more but less than 90% (hereinafter sometimes referred to as "second process for producing conjugated diene copolymer rubber").

[3] The process for producing a conjugated diene copolymer rubber according to the above [2]. wherein the first polyfunctional monomer is continuously added to the reaction system.

[4] The process for producing a conjugated diene copolymer rubber according any one of the above [1] to [3], wherein the copolymerization reaction is initiated in the reaction system further containing a second polyfunctional monomer.

[5] The process for producing a conjugated diene copolymer rubber according to the above [4], wherein the first polyfunctional monomer and/or the second polyfunctional monomer is divinylbenzene.

[6] The process for producing a conjugated diene copolymer rubber according to the above [5], wherein the amount of divinylbenzene to be added to the reaction system when the first polyfunctional monomer is divinylbenzene is 0.001 to 1 part by mass with respect to 100 parts by mass of the total amount of the first conjugated diene compound, second conjugated diene compound, first aromatic vinyl compound, and second aromatic vinyl compound.

[7] The process for producing a conjugated diene copolymer rubber according to the above [5] or [6], wherein the amount of divinylbenzene to be contained in the reaction system when the second polyfunctional monomer is divinylbenzene is 0 to 1 part by mass with respect to 100 parts by mass of the total amount of the first conjugated diene compound and first aromatic vinyl compound.

[8] The process for producing a conjugated diene copolymer rubber according to any one of the above [1] to [7], wherein the modifier is a compound which can react with silica or a mixture of a tin compound and the compound which can react with silica.

[9] The process for producing a conjugated diene copolymer rubber according to the above [8], wherein the compound which can react with silica is at least one compound selected from the group consisting of dibutyldichlorosilane, methyltrichlorosilane, methyldichlorosilane, tetrachlorosilane, triethoxymethylsilane, triphenoxymethylsilane, trimethoxysilane, methyltriethoxysilane, 4,5-epoxyheptylmethyldimethoxysilane, bis(triethoxysilylpropyl) tetrasulfide, N,N-bis(trimethylsilyl)aminopropylmethyldimethoxysilane, and N,N-bis(trimethylsilyl)aminopropylmethyldiethoxysilane.

[10] The process for producing a conjugated diene copolymer rubber according to any one of the above [1] to [9], wherein the first conjugated diene compound and/or the second conjugated diene compound are 1,3-butadiene.

[11] The process for producing a conjugated diene copolymer rubber according to any one of the above[1] to [10], wherein the first aromatic vinyl compound and/or the second aromatic vinyl compound are styrene.

[12] A conjugated diene copolymer rubber produced by the process defined in any one of the above [1] to [11].

According to the first process for producing conjugated diene copolymer rubber, a conjugated diene copolymer rubber capable of obtaining a rubber composition having excellent processability, exhibiting sufficient hardness even after vulcanization, and possessing reduced rolling resistance can be obtained.

According to the second process for producing the conjugated diene copolymer rubber, a conjugated diene copolymer rubber capable of obtaining a rubber composition having excellent processability, exhibiting sufficient hardness even after vulcanization, and possessing reduced rolling resistance can be obtained within a short polymerization time equal to that for conventional processes.

The conjugated diene copolymer rubber of the present invention can produce a rubber composition having excellent processability, exhibiting sufficient hardness even after vulcanization, and possessing reduced rolling resistance.

BEST MODE FOR CARRYING OUT TF INVENTION

Preferred embodiments of the invention are described below. Note that the invention is not limited to the following embodiments. Various modifications and improvements may be made in the embodiments within the scope not deviating from the gist of the invention based on knowledge of a person skilled in the art. In the present specification, a "conjugated diene compound" refers to either or both of the first conjugated diene compound and the second conjugated diene compound, an "aromatic vinyl compound" refers to either or both of the first aromatic vinyl compound and the second aromatic vinyl compound, a "polyfunctional monomer" refers to either or both of the first polyfunctional monomer and the second polyfunctional monomer, and a "process for producing a conjugated diene copolymer rubber of the present invention (this embodiment)" refers to either or both of the first process for producing a conjugated diene copolymer rubber and the second process for producing a conjugated diene copolymer rubber.

One embodiment of the first process for producing a conjugated diene copolymer rubber of the present invention will now be described. The first process for producing a conjugated diene copolymer rubber of this embodiment comprises initiating a copolymerization reaction in a reaction system containing a first conjugated diene compound (A) and a first aromatic vinyl compound (B) and completing the reaction; adding a first polyfunctional monomer (C) to the reaction system optionally further adding a second conjugated diene compound (A) and optionally further adding a second aromatic vinyl compound (B) to further conduct a copolymerization reaction; and subsequently adding a modifier (D) to the reaction system to react these materials, Details of this process are described below.

In the first process for producing a conjugated diene copolymer rubber of this embodiment, a polymerization reaction is initiated in a reaction system containing the first conjugated diene compound (A) and the first aromatic vinyl compound (B). A copolymerization reaction in the presence of the second polyfunctional monomer (C) in this reaction system is also preferable. The copolymerization reaction is carried out in the presence of a predetermined polymerization initiator in an appropriate solvent. The copolymerization may be carried out under either a constant temperature condition within a range of 0 to 120° C. or a temperature rising condition within this range. Either a batch polymerization system or a continuous polymerization system may be used for the polymerization reaction.

During the copolymerization, the polymerization conversion rate is monitored in accordance with a conventional method. When the polymerization conversion rate reaches 90% or more (polymerization reaction completion stage), the first polyfunctional monomer (C) is added to the reaction system and the copolymerization reaction is continued under the same conditions. In this instance the second conjugated diene compound (A) and the second aromatic vinyl compound (B) may be added, if necessary. Next, the modifier (D) is added to the reaction system and the reaction is continued. This reaction is carried out in order to react (couple) a predetermined functional group with polymerization active terminals.

Next, an embodiment of the second process for producing a conjugated diene copolymer rubber of the present invention will now be described. The second process for producing a conjugated diene copolymer rubber of this embodiment is a process for producing a conjugated diene copolymer rubber, which comprises initiating a copolymerization reaction in a reaction system containing a first conjugated diene compound (A) and a first aromatic vinyl compound (B), optionally adding a second conjugated diene compound (A) and optionally further adding a second aromatic vinyl compound (B) to complete the copolymerization reaction, and adding a modifier (D) to the reaction system to react the modifier with the copolymer, wherein a first polyfunctional monomer (C) is added in the course of the reaction at a time when the polymerization conversion rate is 30% or more but less than 90%. Details of this process will be described below.

In the second process for producing a conjugated diene copolymer rubber of this embodiment, a copolymerization reaction is initiated in a reaction system containing the first conjugated diene compound (A) and the first aromatic vinyl compound (B). Initiating the copolymerization reaction in the presence of the second polyfunctional monomer (C) in this reaction system is also preferable. The copolymerization reaction is carried out in the presence of a predetermined polymerization initiator in an appropriate solvent. The copolymerization may be carried out under either a constant temperature condition within a range of 0 to 120° C. or a temperature rising condition within this range. Either a batch polymerization system or a continuous polymerization system may be used for the polymerization reaction.

During the copolymerization, the polymerization conversion rate is monitored in accordance with a conventional method. When the polymerization conversion rate is 30% or more but less than 90%, preferably in a range of 30 to 70%, more preferably in a range of 35 to 60%, the first polyfunctional monomer (C) is added to the reaction system, and the copolymerization reaction is continued under the same conditions to complete reaction. In this instance the second conjugated diene compound (A) and the second aromatic vinyl compound (B) may be added, if necessary The addition of the first polyfunctional monomer (C) to the reaction system in the course of the reaction when the polymerization conversion rate is 30% or more but less than 90% can improve processability of the resulting rubber and complete the polymerization in a period of time equivalent to the period of time required for conventional polymerization processes. Therefore, the production cost can be reduced without the need for employing a complicated process. If the first polyfunctional monomer (C) is added at a stage when the polymerization conversion rate is still less than 30%, processability of the resulting rubber is impaired. If the first polyfunctional monomer (C) is added at a stage when the polymerization conversion rate is 90% or more, although the processability of the resulting rubber is good, it tends to take a long time to complete the polymerization reaction.

As a method for adding the first polyfunctional monomer (C) to the reaction system a method of adding the required amount of the first polyfunctional monomer (C) at one time, a method of adding continuously the required amount of the first polyfunctional monomer (C), and the like can be given. However, a method of continuously adding is more preferable in this embodiment because a rubber with improved processability can be obtained by the continuous addition.

Next, various components used in the process for producing a conjugated diene copolymer rubber of this embodiment will be described.

A) Conjugated diene Compound

As examples of the first conjugated diene compound and second conjugated diene compound used in this embodiment, 1,3-butadiene, isoprene, 2,3-dimethyl-1,3-butadiene, 2-chloro-1,3-butadiene, 1,3-pentadiene, mixtures of these conjugated diene compounds, and the like can be given. Of these, 1,3-butadiene is preferable. The first conjugated diene compound and the second conjugated diene compound may be either the same compound or different compounds. In the present specification, "the first conjugated diene compound" refers to a conjugated diene compound that is used at the time of initiating the polymerization, and "the second conjugated diene compound" refers to a conjugated diene compound added after initiating the polymerization. Either one conjugated diene compound or two or more conjugated diene compounds may be added as the second conjugated diene compound. The second conjugated diene compound may be added either at one time or may be added at two or more times. The method for adding the second conjugated diene compound is not particularly limited. Known methods such as a method of adding at one time, a method of adding in portions, a method of adding continuously, and the like can arbitrarily be employed. However, it is preferable to add the second conjugated diene compound after the addition of the later-described first polyfunctional monomer but before the addition of the modifier (for example, just before the addition) in that the effect of modification can be enhanced by the addition of a modifier.

(B) Aromatic vinyl Compound

As examples of the first aromatic vinyl compound and the second aromatic vinyl compound used in the process for producing the conjugated diene copolymer rubber of this embodiment, styrene, 2-methylstyrene, 3-methylstyrene, 4-methylstyrene, α-methylstyrene, 2,4-dimethylstyrene, 2,4-diisopropylstyrene, 4-tert-butylstyrene, tert-butoxystyrene, vinylbenzyldimethylamine, (4-vinylbenzyl)dimethylaminoethyl ether, N,N-dimethylaminoethylstyrene, vinylpyridine, mixtures of these compounds, and the like can be given. Of these, styrene is preferable. The first aromatic vinyl compound and the second aromatic vinyl compound may be either the same compound or different compounds. In the present specification, "the first aromatic vinyl compound" refers to an aromatic vinyl compound that is used at the time of initiating the polymerization, and "the second aromatic vinyl compound" refers to an aromatic vinyl compound added after initiating the polymerization. Either one aromatic vinyl compound or two or more aromatic vinyl compounds may be added as the second aromatic vinyl compound. The second aromatic vinyl compound may be added either at one time or may be added at two or more times. The method for adding the second aromatic vinyl compound is not particularly limited. Known methods such as a method of adding at one time, a method of adding in portions, a method of adding continuously, and the like can arbitrarily be employed. However, it is preferable to add the second aromatic vinyl compound after the addition of the later-described first polyfunctional monomer but before the addition of the modifier (for example, just before the addition) in that the effect of modification can be enhanced by the addition of a modifier.

(C) Polyfunctional monomer

As examples of the first polyfunctional monomer and second polyfunctional monomer used in this embodiment, divinylbenzene, divinylbiphenyl, divinylnaphthalene, mixtures of these compounds, and the like can be given. Of these, divinylbenzene is preferable. The first polyfunctional monomer and the second polyfunctional monomer may be either the same compound or different compounds. When divinylbenzene is used as the first polyfunctional monomer, the amount of the divinylbenzene to be added to the reaction system after completion of the copolymerization reaction (in the first process for producing a conjugated diene copolymer rubber) or in the course of the copolymerization reaction (in the second process for producing a conjugated diene copolymer rubber) is preferably 0.001 to 1 part by mass, more preferably 0.005 to 0.1 part by mass, and particularly preferably 0.005 to 0.05 part by mass with respect to 100 parts by mass of the total amount of the first conjugated diene compound, the second conjugated diene compound, the first aromatic vinyl compound, and the second aromatic vinyl compound. If the amount of divinylbenzene added to the reaction system after completion or in the course of the copolymerization reaction is less than 0.001 part by mass, the veil form of a copolymer tends to change with the passage of time (cold flow). If it is more than 1 part by mass, the Mooney viscosity of the copolymer tends to remarkably increase with the passage of time.

When divinylbenzene is used as the second polyfunctional monomer, the amount of the divinylbenzene contained in the reaction system at the time of initiating the reaction is preferably 0 to 1 part by mass, more preferably 0 to 0.5 part by mass, and particularly preferably 0 to 0.1 part by mass with respect to 100 parts by mass of the total amount of the first conjugated diene compound and the first aromatic vinyl compound. If the amount of divinylbenzene initially present in the reaction system is more than 1 part by mass, processability of the copolymer tends to be impaired.

(D) Modifier

As the modifier used in the process for producing the conjugated diene copolymer rubber of this embodiment, a compound which can react with silica or a mixture of a tin compound and the compound which can react with silica is preferable. The compound which can react with silica is preferably at least one compound selected from the group consisting of dibutyldichlorosilane, methyltrichlorosilane, methyldichlorosilane, tetrachlorosilane, triethoxymethylsilane, triphenoxymethylsilane, trimethoxysilane, methyltriethoxysilane, 4,5-epoxyheptylmethyldimethoxysilane, bis(triethoxysilylpropyl)tetrasulfide, N,N-bis(trimethylsilyl)aminopropylmethyldimethoxysilane, and N,N-bis(trimethylsilyl)aminopropylmethyldiethoxysilane. Of these N,N-bis(trimethylsilyl)aminopropylmethyldiethoxysilane (hereinafter sometimes referred to as "Si—N modifier") is particularly preferable.

When an Si—N modifier is used as a compound which can react with silica and the later-described alkyllithium is used as a polymerization initiator, the molar ratio of the Si—N modifier and lithium atom (Li) which forms the alkyllithium, (Si—N modifier)/(Li), is preferably 0.2 to 1.0, and more preferably 0.3 to 0.8. If the ratio (Si—N modifier)/(Li) is less than 0.2, the rolling resistance tends to be impaired. If the ratio (Si—N modifier)/(Li is more than 1.0, the unreacted modifier tends to remain resulting in a cost increase.

As examples of tin compounds that can preferably be used, Tin tetrachloride, Tin tetrabromide, trichlorobutyltin, trichloromethyltin, trichlorooctyltin, dibromodimethyltin, dichlorodimethyltin, dichlorodibutyltin, dichlorodioctyltin, 1,2-bis(trichlorostanyl)ethane, 1,2-bis(methyldichlorostanylethane), 1,4-bis(trichlorostanyl)butane, 1,4-bis(methyldichlorostanyl)butane, ethyltin tristearate, butyltin trisoctanoate, butyltin trisstearate, butyltin trislaurate, dibutyltin bisoctanoate, dibutyltin bisstearate, dibutyltin bislaurate, and the like can be given. Of these, Tin tetrachloride ($SnCl_4$) is particularly preferable.

When Tin tetrachloride ($SnCl_4$) is used as a tin compound and the later-described alkyllithium is used as a polymerization initiator, the molar ratio of the Tin tetrachloride ($SnCl_4$) and lithium atom (Li) which forms the alkyllithium, ($SnCl_4$)/(Li), is preferably 0 to 0.2, and more preferably 0 to 0.175. If the ratio ($SnCl_4$)/(Li) is more than 0.2, the amount of Si—N modifier is insufficient and the rolling resistance tends to be impaired.

(E) Other Components

As a polymerization initiator for the copolymerization reaction, an organic alkali metal, an organic alkaline earth metal, and the like can be used. As the examples of the organic alkali metal, organic alkaline earth metal, and the like, alkyl lithium such as n-butyllithium, sec-butyllithium, t-butyllithium, and the like; alkylenedilithium such as 1,4-dilithiobutane, and the like; organolithium compounds such as phenyllithium, stilbenelithium, lithium naphthalene, and the like, sodium naphthalene, potassium naphthalene, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, diethylaminobarium, barium stearate, and the like can be given. Of these, n-butyl lithium and sec-butyllithium are preferable.

It is also possible to react the organic alkali metal mentioned above with a predetermined secondary amine compound or tertiary amine compound and to use the resulting reaction product as a polymerization initiator for copolymerization reaction. As the organic alkali metal to be reacted with a secondary amine compound or a tertiary amine compound, an organic lithium compound is preferable, and n-butyllithium and sec-butyllithium are more preferable.

As examples of the secondary amine compound to be reacted with the organic alkali metal, dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine 5-benzyloxyindole. 3-azaspiro[5.5]undecane, 3-azabicyclo[3.2.2]nonane, carbazole, and the like can be given.

As examples of the tertiary amine compound to be reacted with the organic alkali metal, NN-dimethyl-o-toluidine, N,N-dimethyl-p-toluidine, N,N-dimethyl-m-toluidine, α-picoline, β-picoline, γ-picoline, benyldimethylamine, benzyldiethylamine, benzyldipropylamine, benzyldibutylamine, (o-methylbenzyl)dimethylamine, (m-methylbenzyl)dimethylamine, (p-methylbenzyl)dimethylamine, N,N-tetramethylene-o-toluidine, N,N-heptamethylene-o-toluidine, N,N-hexamethylene-o-toluidine, N,N-trimethylenebenzylamine, N,N-tetramethylenebenzylamine, N,N-hexamethylenebenzylamine, N,N-tetramethylene(o-methylbenzyl)amine, N,N-tetramethylene(p-methylbenzyl)amine, N,N-hexamethylene(o-methylbenzyl)amine, N,N-hexamethylene (p-methylbenzyl)amine, and the like can be given.

In the process for producing a conjugated diene copolymer rubber of this embodiment, addition of an ether compound and/or a tertiary amine compound to the reaction system is preferable in order to control the microstructure of the conjugated diene area (the vinyl bond content) of the resulting conjugated diene copolymer rubber. Examples of the ether compound include diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran, 2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene, dimethoxyethane, and the like. As examples of the tertiary amine compound, triethylamine, pyridine, NN,N',N'-tetramethylethylenediamine, dipiperidinoethane, methyl ether of N,N-diethylethanolamine, ethyl ether of N,N-diethylethanolamine, and butyl ether of N,N-diethylethanolamine can be given, As the solvent usable in the process for producing a conjugated diene copolymer rubber of this embodiment, hydrocarbon solvents can be given. As examples of the hydrocarbon solvent, pentane, hexane, heptane, octane, methylcyclopentane, cyclohexane, benzene, toluene, xylene, and the like can be given Of these compounds, cyclohexane and heptane are particularly preferable, In the process for producing a conjugated diene copolymer rubber of this embodiment, a potassium compound may be added to the reaction system together with a polymerization initiator. The addition of a potassium compound to the reaction system together with the polymerization initiator can improve reactivity of the polymerization initiator used, enabling random alignment of aromatic vinyl compounds introduced in the resulting conjugated diene copolymer rubber or formation of a simple chain of aromatic vinyl compounds. Given as examples of the potassium compound which may be added together with the polymerization initiator are potassium alkoxides such as potassium isopropoxide, potassium tert-butoxide, potassium tert-amyloxide, potassium n-heptaoxide, potassium benzyloxide, and the like; potassium phenoxides; potassium salts of isovalerianic acid, caprylic acid, laurylic acid, palmitic acid, stearic acid, oleic acid, linolenic acid, benzoic acid, phthalic acid, or 2-ethylhexanoic acid; potassium salts of organic sulfonic acids such as dodecylbenzenesulfonic acid, tetradecylbenzenesulfonic acid, hexadecylbenzenesulfonic acid, and octadecylbenzenesulfonic acid; and potassium salts of organic phosphorous acid partial esters such as diethyl phosphite, diisopropyl phosphite, diphenyl phosphite, dibutyl phosphite, dilauryl phosphite, and the like.

The above-mentioned potassium compounds are preferably added, as necessary, in an amount up to 0.5 mol per one gram atom equivalent of the alkali metal or alkaline earth metal used as a polymerization initiator. If more than 0.5 mol the polymerization activity may decrease, resulting in a decrease in productivity, and the efficiency of modification in the reaction for modifying the polymerization active terminals using a modifier may decrease.

The target conjugated diene copolymer rubber can be isolated from the reaction system (the polymerization reaction solution) containing the conjugated diene copolymer rubber using a method employed in conventional solution polymerization methods. Specifically, after adding a stabilizer and the like to the reaction system in the state of a solution, extender oil such as aromatic process oil, and naphthenic process oil and a liquid polymer with a weight average molecular weight of not more than 150,000 (or a solution of the liquid polymer) are added, as necessary. Subsequently, the copolymer is separated from the solvent by a direct drying method or a steam stripping method, followed by washing and drying using a vacuum dryer, hot air dryer, roller, and the like to isolate the conjugated diene copolymer rubber.

Next, an embodiment of the conjugated diene copolymer rubber of the present invention will be described. The conjugated diene copolymer rubber of this embodiment is produced by the process for producing the conjugated diene copolymer rubber of the above-described embodiment of the present invention. Therefore, the conjugated diene copolymer rubber has an effect of providing a rubber composition having excellent processability, exhibiting sufficient hardness even after vulcanization, and possessing reduced rolling resistance.

The Mooney viscosity ($ML_{1+4}$, 100° C.) of the conjugated diene copolymer rubber of this embodiment is preferably in the range from 20 to 200, and more preferably from 35 to 100. If the Mooney viscosity ($ML_{1+4}$, 100° C.) is less than 20, the breaking strength, abrasion resistance, and low hysteresis loss properties tend to decrease. If the Mooney viscosity $ML_{1+4}$, 100° C.) is more than 200, processability tends to be impaired.

Although the conjugated diene copolymer rubber having a Mooney viscosity ($ML_{1+4}$, 100° C.) of more than 100 may have insufficient processability, if used alone, sufficient processability can be obtained if the Mooney viscosity ($ML_{1+4}$, 100° C.) is made to be 100 or less by the addition of an extender oil such as aromatic process oil and naphthenic process oil or a liquid polymer having a weight average molecular weight of 150,000 or less. Although any extender oil or softening agent commonly used for diene rubbers can be used as the extender oil without particular limitations, a mineral oil-based extender oil is preferable. Generally, mineral oil-based extender oil is a mixture of aromatic oil, alicyclic oil, and aliphatic oil and classified into an aromatic-type, alicyclic-type, and aliphatic-type according to the mixing rate among them. Any type can be used in this embodiment. Aromatic-type mineral oil (aromatic oil) with a viscosity gravity constant (VGC value) of 0.900 to 1.049 or aliphatic-type mineral oil (naphthenic oil) with a VGC value of 0.800 to 0.899 is preferable from the viewpoint of low hysteresis/wet skid resistance.

EXAMPLES

The present invention is described below in detail based on examples. However, the present invention is not limited to the following examples. In the examples and comparative examples, "part(s)" means "part(s) by mass" and "%" means "mass %" unless otherwise indicated. The methods used for measuring and evaluating various properties were as follows.

[Bonded styrene content (%)]: determined by 270 MHz $^1$H-NMR

[Vinyl (of butadiene moiety) content (%)]: determined by 270 MHz $^1$H-NMR

[Peak molecular weight before modification reaction]: determined by using Gel permeation chromatography (GPC) analysis using "HLC-8120GPC" manufactured by Tosoh Corp. for obtaining a GPC curve, which was used for obtaining molecular weight in terms of polystyrene from the retention time corresponding with the peak of the curve corresponding to the polymer part excluding the polymer contributing to the molecular weight increase due to the reaction with polyfunctional monomers, compounds that can react with silica, and a tin compound.

[Mooney viscosity ($ML_{1+4}$, 100° C.)]: measured using an L-rotor according to JIS K6300 with a preheating time of one minute and a rotor operation time of 4 minutes at a temperature of 100° C.

[Measurement and Evaluation of Vulcanized Rubber Properties]

(i)[Roll Processability (Sheet Surface)]:

A compounded rubber without the addition of sulfur and a vulcanization accelerator was kneaded ("A-kneading") and processed through a roller to form a sheet. Luster of the surface of the sheet was observed by the naked eye. The following criteria were used for the evaluation.

⊚: Very Good
o: Good
Δ: Fair
X: Bad
XX: Extremely bad (ii) [Compounded Rubber Mooney Viscosity]:

Mooney viscosity of a compounded rubber before vulcanization was measured using an L-rotor according to JIS K6300 with a preheating time of one minute and a rotor operation time of 4 minutes at a temperature of 100° C. The result was indicated by an index. The larger the index is, the better the processability is.

(iii) [70° C. tan δ]:

tan δ of a vulcanized rubber as a measurement sample was measured using a dynamic spectrometer manufactured by Rheometrix Co. (U.S.A) under the conditions of a tensile dynamic strain of 0.7% and an angle velocity of 100 radian/sec at 70° C. The result was indicated by an index. The larger the index is, the smaller (better) the rolling resistance is.

(iv) [0° C. tan δ]:

tan δ of a vulcanized rubber as a measurement sample was measured using a dynamic spectrometer manufactured by Rheometrix Co. (U.S.A) under the conditions of a tensile dynamic strain of 0.14% and an angle velocity of 100 radian sec at 100° C., The result was indicated by an index. The larger the index is, the larger (better) the wet s id resistance is.

(v) [DIN Abrasion Test]:

Abrasion resistance of a vulcanized rubber as a measurement sample was measured according to JIS K6264 using a DIN abrader (manufactured by Toyo Seiki Seisaku-Sho, Ltd.) under the conditions of a load of 10 N at 25° C. The result was indicated by an index. The larger the index is, the better the abrasion resistance is.

Example 1

A 5l autoclave reaction vessel of which the internal atmosphere was replaced by nitrogen was charged with 2,750 g of cyclohexane, 32 g of tetrahydrofuran, 149 g of styrene, and 391 g of 1,3-butadiene. After adjusting the temperature of the content of the reaction vessel to 20° C., 330 mg of n-butyllithium was added to initiate the polymerization. The polymerization was carried out under thermally insulated conditions, and the maximum temperature reached 85° C. 0.055 g of divinylbenzene (purity: 55 mass %) (as m- and p-divinylbenzene) and 11 g of 1,3-butadiene were added when the polymerization conversion rate reached 99%, and the mixture was further polymerized for 15 minutes, whereupon 1,122 mg of N,N-bis(trimethylsilyl)aminopropylmethyldiethoxysilane was added, followed by further polymerization for 15 minutes. After completion of the polymerization reaction, 2,6-di-t-butyl-p-cresol was added to the polymer solution. Next, the solvent was removed by steam stripping, and the rubber was dried by a heat roll at 110° C. to obtain a copolymer rubber (Example 1). The resulting copolymer rubber had a vinyl content of 57%, a bonded styrene content of 27%, a peak molecular weight before the modification reaction of $22 \times 10^4$, and a Mooney viscosity ($ML_{1+4}$, 100° C.) of 41.

Comparative Example 1

A solution-polymerization styrene-butadiene rubber ("SL563" manufactured by JSR Corp.) was used as a copolymer of Comparative Example 1 Various properties of the solution-polymerization styrene-butadiene rubber are shown in Table 1

Comparative Example 2

A 5l autoclave reaction vessel of which the internal atmosphere was replaced with nitrogen was charged with 2,750 g of cyclohexane, 32 g of tetrahydrofuran, 149 g of styrene, 391 g of 1,3-butadiene, and 0.055 g of divinylbenzene (purity: 55 mass %) (as m- and p-divinylbenzene). After adjusting the temperature of the content of the reaction vessel to 20° C., 330 mg of n-butyllithium was added to initiate the polymerization. The polymerization was carried out under heat insulated conditions, and the maximum temperature reached 85° C. When the polymerization conversion rate reached 99%, 11 g of 1,3-butadiene was added, then 54 mg of Tin tetrachloride was added. After three minutes, 1,122 mg of N,N-bis(trimethylsilyl)aminopropyl-methyldiethoxysilane was added and the mixture was reacted for a further 15 minutes, After completion of the polymerization reaction, 2,6-di-t-butyl-p-cresol was added to the polymer solution. Next, the solvent was removed by steam stripping, and the rubber was dried by a heat roll at 110° C. to obtain a copolymer rubber (Comparative Example 2). Various properties of the copolymer rubber are shown in Table 1.

TABLE 1

|  | Example 1 | Comparative Example 1 | Comparative Example 2 |
|---|---|---|---|
| DVB*[1] pre-addition (part) | — | — | 0.01 |
| DVB*[1] post-addition (part) | 0.01 | — | — |
| Terminal 1,3-butadiene (part) | 2 | 2 | 2 |
| (Si—N modifier)/(Li) ratio (molar ratio) | 0.65 | — | 0.65 |
| (SnCl$_4$)/(Li) ratio (molar ratio) | — | 0.19 | 0.04 |
| Vinyl content (%) | 57 | 62 | 57 |
| Bonded styrene content (%) | 27 | 20 | 27 |
| Peak molecular weight before modification reaction (E + 04) | 22 | 23 | 22 |
| Mooney viscosity (ML$_{1+4}$, 100° C.) | 41 | 74 | 47 |

*[1]Divinylbenzene

Example 2

A 5l autoclave reaction vessel of which the internal atmosphere was replaced by nitrogen was charged with 2,500 g of cyclohexane, 25 g of tetrahydrofuran, 135 g of styrene, and 355 g of 1,3-butadiene. After adjusting the temperature of the content of the reaction vessel to 10° C., 315 mg of n-butyllithium was added to initiate the polymerization. The polymerization was carried out under heat insulated conditions and the maximum temperature reached 85° C. When the polymerization conversion rate reached 35%, 0.070 g of divinylbenzene (purity: 55%) (as m- and p-divinylbenzene, equivalent to 0.014 part with respect to 100 parts of styrene and 1,3-butadiene charged at the initial stage of reaction) was added continuously while continuing the polymerization until the polymerization conversion rate reached 55%. When the polymerization conversion rate reached 99% (at 26 minutes after initiation of polymerization), 10 g of 1,3-butadiene was added in two minutes, then 49 mg of Tin tetrachloride was added. One minute thereafter, 1,025 mg of N,N-bis(trimethylsilyl)aminopropylmethyldiethoxysilane was added, and the mixture was reacted for a further 15 minutes. After completion of the polymerization reaction, 2,6-di-t-butyl-p-cresol was added to the polymer solution. Next, the solvent was removed by steam stripping, and the rubber was dried by a heat roll at 110° C. to obtain a copolymer rubber (Example 2). The resulting copolymer rubber had a vinyl content of 57%, a bonded styrene content of 27%, a peak molecular weight before the modified reaction of $23\times10^4$, and a Mooney viscosity ($ML_{1+4}$, 100° C.) of 45.

Example 3

A copolymer rubber (Example 3) was obtained in the same manner as in Example 2 except that 0.070 g of divinylbenzene (purity: 55%) (as m- and p-divinylbenzene, equivalent to 0.014 part with respect to 100 parts of styrene and 1,3-butadiene charged at the initial stage of reaction) was added at one time when the polymerization conversion rate reached 35%. Various properties of the copolymer rubber are shown in Table 2.

Example 4

A copolymer rubber (Example 4) was obtained in the same manner as in Example 2 except that, when the polymerization conversion rate reached 35%, 0.070 g of divinylbenzene (purity: 55%) (as m- and p-divinylbenzene, equivalent to 0.014 part with respect to 100 parts of styrene and 1,3-butadiene charged at the initial stage of reaction) was added continuously until the polymerization conversion rate reached 88%. Various properties of the copolymer rubber are shown in Table 2.

Comparative Example 3

A styrene-butadiene rubber prepared by solution polymerization ("SL563" manufactured by JSR Corp.) was used as a copolymer of Comparative Example 3. Various properties of the solution-polymerization styrene-butadiene rubber are shown in Table 2.

Comparative Example 4

A 5 l autoclave reaction vessel of which the internal atmosphere was replaced with nitrogen was charged with 2,500 g of cyclohexane, 25 g of tetrahydrofuran, 135 g of styrene, 355 g of 1,3-butadiene, and 0.028 g of divinylbenzene (purity: 55%) (as m- and p-divinylbenzene, equivalent to 0.006 part with respect to 100 parts of styrene and 1,3-butadiene charged at the initial stage of reaction). After adjusting the temperature of the content in the reaction vessel to 20° C., 315 mg of n-butyllithium was added to initiate the polymerization. The polymerization was carried out under heat insulated conditions, and the maximum temperature reached 85° C. When the polymerization conversion rate reached 99% (at 26 minutes after initiation of polymerization), 10 g of 1,3-butadiene was added in two minutes, and then 49 mg of Tin tetrachloride was added. One minute thereafter, 1,025 mg of N,N-bis(trimethylsilyl)aminopropylmethyldiethoxysilane was added, and the mixture was reacted for further 15 minutes. After completion of the polymerization reaction, 2,6-di-t-butyl-p-cresol was added to the polymer solution. Next, the solvent was removed by steam stripping, and the rubber was dried by a heat roll at 110° C. to obtain a copolymer rubber (Comparative Example 4). Various properties of the copolymer rubber are shown in Table 2.

Comparative Example 5

A copolymer rubber (Comparative Example 5) was obtained in the same manner as in Example 2 except that, when the polymerization conversion rate reached 15%, 0.070 g of divinylbenzene (purity: 55%) (as m- and p-divinylbenzene, equivalent to 0.014 part with respect to 100 parts of styrene and 1,3-butadiene charged at the initial stage of reaction) was added continuously until the polymerization conversion rate reached 35%. Various properties of the copolymer rubber are shown in Table 2.

TABLE 2

| | | Example 2 | Example 3 | Example 4 | Comparative Example 3 | Comparative Example 4 | Comparative Example 5 |
|---|---|---|---|---|---|---|---|
| DVB*[1] | Initial content (part) | — | — | — | — | 0.006 | — |
| | Post-addition amount (part) | 0.014 | 0.014 | 0.014 | — | — | 0.014 |
| | Addition method | Adding continuously | Adding at one time | Adding continuously | — | — | Adding continuously |
| Polymerization conversion rate (%) | At the time of initiating addition | 35 | 35 | 55 | — | — | 15 |
| | At the time of completing addition | 55 | — | 88 | — | — | 35 |
| Time required for first step polymerization (min) | | 26 | 26 | 26 | 27 | 26 | 26 |
| Terminal 1,3-butadiene (part) | | 2 | 2 | 2 | 2 | 2 | 2 |
| (Si—N modifier)/(Li) ratio (molar ratio) | | 0.65 | 0.65 | 0.65 | — | 0.65 | 0.65 |
| ($SnCl_4$)/(Li) ratio (molar ratio) | | 0.04 | 0.04 | 0.04 | 0.19 | 0.04 | 0.04 |
| Vinyl content (%) | | 57 | 57 | 57 | 62 | 57 | 57 |
| Bonded styrene content (%) | | 27 | 27 | 27 | 20 | 27 | 27 |
| Peak molecular weight before modification reaction (E + 04) | | 23 | 23 | 23 | 23 | 22 | 22 |
| Mooney viscosity ($ML_{1+4}$, 100° C.) | | 45 | 44 | 41 | 74 | 47 | 43 |

*[1]Divinylbenzene

Preparation of Vulcanized Rubber Composition

Rubber compositions prepared from the rubber composition formulation shown in Table 3 using a 250 ml Labo Plastomill were vulcanized. A-kneading was carried out at 100° C. at 50 rpm for about three minutes, during which the meter temperature of the dump was about 140° C. and the true temperature was about 150° C. After A-kneading, the rubber compositions were kneaded while adding sulfur and a vulcanization accelerator ("B-leading") at 70° C. at 60 rpm for one minute. Processability, rolling resistance, wet skid resistance, and abrasion resistance of the resulting vulcanized rubbers were evaluated. The results are shown in Table 4.

TABLE 3

| Component of rubber composition | Part |
| --- | --- |
| Copolymer rubber (Examples 1 to 4 and Comparative Examples 1 to 5) | 70 |
| High cis butadiene rubber*[1] | 30 |
| Silica*[2] | 70 |
| Silane coupling agent*[3] | 5.6 |
| Carbon black*[4] | 5.6 |
| Extender oil*[5] | 37.5 |
| Stearic acid | 2 |
| Antiaging agent*[6] | 1 |
| Zinc oxide | 3 |
| Vulcanization accelerator (1)*[7] | 1.5 |
| Vulcanization accelerator (2)*[8] | 1.8 |
| Sulfur | 1.5 |

*[1]"BR01" manufactured by JSR Corp.
*[2]"1165MP" manufactured by Rhodia
*[3]"Si69" manufactured by Degussa
*[4]"Diablack N339" manufactured by Mitsibishi Chemical Corp.
*[5]"Fuccol Aromax #3" manufactured by Fuji Kosan Co., Ltd.
*[6]"Nocrac 6C" manufactured by Ouchi Shinko Chemical Industrial Co., Ltd.
*[7]"Nocceler D" manufactured by Ouchi Shinko Chemical Industrial Co., Ltd.
*[8]"Nocceler CZ" manufactured by Ouchi Shinko Chemical Industrial Co., Ltd.

TABLE 4

| | | | Comparative Example | | Example | | | Comparative Example | | |
| --- | --- | --- | --- | --- | --- | --- | --- | --- | --- | --- |
| Type of copolymer rubber | | Example 1 | 1 | 2 | 2 | 3 | 4 | 3 | 4 | 5 |
| Processability | Roll processability (sheet surface) | ◎ | ◎ | XX | ◎ | ○ | ◎ | ◎ | XX | X |
| | Compounded rubber Mooney viscosity (index) | 109 | 100 | 91 | 99 | 96 | 100 | 100 | 91 | 93 |
| Rolling resistance | 70° C. tan δ (index) | 118 | 100 | 120 | 120 | 118 | 121 | 100 | 120 | 121 |
| Wet skid resistance | 0° C. tan δ (index) | 173 | 100 | 186 | 170 | 164 | 162 | 100 | 163 | 166 |
| Abrasion resistance | DIN abrasion test (index) | 105 | 100 | 106 | 105 | 106 | 105 | 100 | 106 | 105 |

As shown in Table 4, the rubber composition of Comparative Example 2 showed impaired processability although the rolling resistance, wet skid resistance, and abrasion resistance were good, compared with that of Comparative Example 1. On the other hand, the rubber compositions of the Examples showed improved processability, while exhibiting excellent rolling resistance, wet skid resistance, and abrasion resistance equivalent to those exhibited by the rubber composition of Comparative Example 2.

In addition, as shown in Table 2, it became clear that the time required for the first step polymerization in Examples 2 to 4 is equivalent to the time required for the first step polymerization of Comparative Examples 3 and 4 and that the polymerization reaction is completed in a short time. Furthermore, as shown in Table 4, the rubber composition of Comparative Example 4 shows impaired processability although the rolling resistance, wet skid resistance, and abrasion resistance are good. On the other hand, it became clear that the rubber compositions of Examples 2 to 4 have improved processability, while exhibiting excellent rolling resistance, wet skid resistance, and abrasion resistance equivalent to those exhibited by the rubber composition of Comparative Example 4. Comparing the case in which divinylbenzene was added at one time (Example 3) with the case in which divinylbenzene was continuously added (Examples 2 and 4), it is clear that the continuous addition is more effective in improving processability of the rubber composition.

INDUSTRIAL APPLICABILITY

The conjugated diene copolymer rubber of the present invention can suitably be used as a rubber constituting a rubber composition for treads, sidewalls, and carcasses of vehicle tires, as well as other industrial products such as belts, hoses, vibration-proof rubber, and footwear.

The invention claimed is:

1. A process for producing a conjugated diene copolymer rubber which comprises: initiating a copolymerization reaction in a reaction system comprising a first conjugated diene compound and a first aromatic vinyl compound, optionally adding a second conjugated diene compound and optionally adding a second aromatic vinyl compound to the reaction system during the copolymerization reaction, and completing the copolymerization reaction, and then adding a modifier to the reaction system, wherein a first polyfunctional monomer is added to the reaction system in the course of the reaction at a time when the polymerization conversion rate is 30% -70%.

2. The process for producing a conjugated diene copolymer rubber according to claim 1, wherein the first polyfunctional monomer is continuously added to the reaction system.

3. The process for producing a conjugated diene copolymer rubber according to claim 1, wherein the reaction system futher comprises a second polyfunctional monomer when the copolymerization reaction is initiated.

4. The process for producing a conjugated diene copolymer rubber according to claim 3, wherein the first polyfunctional monomer and/or the second polyfunctional monomer is divinylbenzene.

5. The process for producing a conjugated diene copolymer rubber according to claim 4, wherein the first polyfunctional monomer is divinylbenzene and the amount of divinylbenzene added to the reaction system as the first polyfunctional monomer is is 0.001 to 1 part by mass with respect to 100 parts by mass of the total amount of the first conjugated diene compound, second conjugated diene compound, first aromatic vinyl compound, and second aromatic vinyl compound.

6. The process for producing a conjugated diene copolymer rubber according to claim 4, wherein the second polyfunctional monomer is divinylbenzene and the amount of divinylbenzene present in the reaction system is greater than 0 to 1 part by mass with respect to 100 parts by mass of the total amount of the first conjugated diene compound and first aromatic vinyl compound.

7. The process for producing a conjugated diene copolymer rubber according to claim 1, wherein the modifier is a compound which can react with silica or a mixture of a tin compound and a compound which can react with silica.

8. The process for producing a conjugated diene copolymer rubber according to claim 7, wherein the compound which can react with silica is at least one compound selected from the group consisting of dibutyldichlorosilicon, methyltrichlorosilicon, methyldichlorosilicon, tetrachlorosilicon, triethoxymethylsiliane, triphenoxymethylsilane, trimethoxysilane, methyltriethoxysilane, 4,5-epoxyheptylmethyldimethoxysilane, bis(triethoxysilylpropyl)tetrasulfide, N,N-bis(trimethylsilyl)aminopropylmethyldimethoxysilane, and N,N-bis(trimethylsilyl)aminopropylmethyldiethoxysilane.

9. The process for producing a conjugated diene copolymer rubber according to claim 1, wherein the first conjugated diene compound and/or the second conjugated diene compound is 1,3-butadiene.

10. The process for producing a conjugated diene copolymer rubber according to claim 1, wherein the first aromatic vinyl compound and/or the second aromatic vinyl compound is styrene.

11. A conjugated diene copolymer rubber produced by the process according to claim 1.

12. The process for producing a conjugated diene copolymer rubber according to claim 6, the second polyfunctional monomer is divinylbenzene and wherein the amount of divinylbenzene present in the reaction system is greater than 0 to 1 part by mass with respect to 100 parts by mass of the total amount of the first conjugated diene compound and first aromatic vinyl compound.

13. The process for producing a conjugated diene copolymer rubber according to claim 8, wherein the compound which can react with silica is N,N-bis(trimethylsilyl)aminopropylmethyldiethoxysilane.

14. The process for producing a conjugated diene copolymer rubber according to claim 1, which comprises: initiating a copolymerization reaction in a reaction system comprising a first conjugated diene compound and a first aromatic vinyl compound, adding a second conjugated diene compound and optionally adding a second aromatic vinyl compound to the reaction system during the copolymerization reaction, and completing the copolymerization reaction, and then adding a modifier to the reaction system, wherein a first polyfunctional monomer is added to the reaction system in the course of the reaction at a time when the polymerization conversion rate is 30% or more, but less than 70%.

15. The process for producing a conjugated diene copolymer rubber according to claim 1, which comprises: initiating a copolymerization reaction in a reaction system comprising a first conjugated diene compound and a first aromatic vinyl compound, optionally adding a second conjugated diene compound and adding a second aromatic vinyl compound to the reaction system during the copolymerization reaction, and completing the copolymerization reaction, and then adding a modifier to the reaction system, wherein a first polyfunctional monomer is added to the reaction system in the course of the reaction at a time when the polymerization conversion rate is 30% or more, but less than 70%.

16. The process for producing a conjugated diene copolymer rubber according to claim 1, which comprises: initiating a copolymerization reaction in a reaction system comprising a first conjugated diene compound and a first aromatic vinyl compound, adding a second conjugated diene compound and adding a second aromatic vinyl compound to the reaction system during the copolymerization reaction, and completing the copolymerization reaction, and then adding a modifier to the reaction system, wherein a first polyfunctional monomer is added to the reaction system in the course of the reaction at a time when the polymerization conversion rate is 30% or more, but less than 70%.

17. The process for producing a conjugated diene copolymer rubber according to claim 1, wherein said first conjugated diene compound is selected from the group consisting of 1,3-butadiene, isoprene, 2,3-dimethyl-1,3-butadiene, 2-chloro-1,3-butadiene, and 1,3-pentadiene.

18. The process for producing a conjugated diene copolymer rubber according to claim 1, wherein said first aromatic vinyl compound is selected from the group consisting of styrene, 2-methylstyrene, 3-methylstyrene, 4-methylstyrene, .alpha.-methylstyrene, 2,4-dimethylstyrene, 2,4-diisopropylstyrene, 4-tert-butylstyrene, tert-butoxystyrene, vinylbenzyldimethylamine, (4-vinylbenzyl)dimethyl aminoethyl ether, N,N-dimethylaminoethylstyrene, vinylpyridine.

19. The process for producing a conjugated diene copolymer rubber according to claim 17, wherein said first aromatic vinyl compound is selected from the group consisting of styrene, 2-methylstyrene, 3-methylstyrene, 4-methylstyrene, .alpha.-methyistyrene, 2,4-dimethyistyrene, 2,4-diisopropylstyrene, 4-tert-butyistyrene, tert-butoxystyrene, vinylbenzyldimethylamine, (4-vinylbenzyl)dimethylaminoethyl ether, N,N-dimethylaminoethylstyrene, vinylpyridine.

20. The process for producing a conjugated diene copolymer rubber according to claim 1, wherein said first conjugated diene compound is 1,3-butadiene and said first aromatic vinyl compound is styrene, and said first polyfunctional monomer is divinylbenzene.

21. The process for producing a conjugated diene copolymer rubber according to claim 1, wherein said first polyfunctional monomer is added to the reaction system in the course of the reaction at a time when the polymerization conversion rate is 35%-60%.

* * * * *